(12) United States Patent
Chavez

(10) Patent No.: US 9,258,143 B2
(45) Date of Patent: Feb. 9, 2016

(54) CONTEXTUAL SUMMARY OF RECENT COMMUNICATIONS METHOD AND APPARATUS

(75) Inventor: David L. Chavez, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 663 days.

(21) Appl. No.: 12/708,759

(22) Filed: Feb. 19, 2010

(65) Prior Publication Data

US 2011/0208816 A1    Aug. 25, 2011

(51) Int. Cl.
  *G06Q 10/10* (2012.01)
  *H04L 12/58* (2006.01)
(52) U.S. Cl.
  CPC .............. *H04L 12/583* (2013.01); *G06Q 10/10* (2013.01); *G06Q 10/107* (2013.01); *H04L 51/063* (2013.01); *H04L 12/5855* (2013.01)
(58) Field of Classification Search
  CPC .. H04L 65/1016; G06N 5/0003; G06Q 10/10; G06Q 10/107
  USPC ......... 709/203, 206, 207, 212, 213, 216, 217, 709/219
  See application file for complete search history.

(56) References Cited

U.S. PATENT DOCUMENTS

| | | | | |
|---|---|---|---|---|
| 8,438,225 | B2 * | 5/2013 | Serr ........................ | G06Q 10/00 709/204 |
| 2003/0065768 | A1 | 4/2003 | Malik | |
| 2003/0131069 | A1 * | 7/2003 | Lucovsky et al. ............. | 709/217 |
| 2006/0287901 | A1 * | 12/2006 | Grad ........................ | G06Q 10/10 434/236 |
| 2007/0067398 | A1 * | 3/2007 | Karmarkar .................... | 709/206 |
| 2008/0115149 | A1 | 5/2008 | Rupp et al. | |
| 2008/0261593 | A1 * | 10/2008 | Wong .................. | H04W 72/048 455/435.1 |
| 2009/0182788 | A1 * | 7/2009 | Chung ................. | G06Q 10/107 |
| 2009/0215479 | A1 | 8/2009 | Karmarkar | |
| 2010/0262661 | A1 * | 10/2010 | McColgan et al. ........... | 709/206 |
| 2010/0312836 | A1 * | 12/2010 | Serr et al. ...................... | 709/206 |
| 2011/0161445 | A1 * | 6/2011 | Nelke et al. ................... | 709/206 |

FOREIGN PATENT DOCUMENTS

| | | |
|---|---|---|
| EP | 1988696 | 11/2008 |
| WO | WO 03/058519 | 7/2003 |
| WO | WO 2006/011857 | 2/2006 |
| WO | WO 2007/038142 | 4/2007 |
| WO | WO 2008/079514 | 7/2008 |

OTHER PUBLICATIONS

Reinhard, U.S. Appl. No. 12/640,312, , Entitled "Social Network Query and Response System to Locate Subject Matter Expertise", filed Dec. 17, 2009, 47 pages.
Reinhard, U.S. Appl. No. 12/545,715, Entitled "Communications History Log System", filed Aug. 21, 2009, 35 pages.
Search Report for UK Patent Application No. GB1102748.9, dated Jun. 7, 2011.
BACKGROUND OF THE INVENTION for the above-captioned application filed Feb. 19, 2010 (previously provided).

* cited by examiner

*Primary Examiner* — Barbara Burgess
(74) *Attorney, Agent, or Firm* — Sheridan Ross P.C.

(57) ABSTRACT

The present invention provides mechanisms for determining contextual information and including at least some of the determined contextual information in a communication. As an example, a multi-modal communications thumbnail providing context and prior communications summary as an attachment to a communication may be provided. The context and prior communications summary may supplement or replace one or more of a typical communications identifier such as subject, title, and distribution information.

20 Claims, 6 Drawing Sheets

CONTEXTUAL SUMMARY OF RECENT COMMUNICATIONS METHOD AND APPARATUS

FIELD OF THE INVENTION

The invention relates generally to communications and more specifically to contextual-based improvements to communications.

BACKGROUND

With the increased volume of communications and communications modalities a person utilizes today, a significant problem exists today with regards to integrating the communications. Communications have indeed become quite complicated. Furthermore, complex communications on a single subject may include multiple modalities, such as voice, video, email, Instant Messaging (IM), Short Message Service (SMS) messaging, blogs, social media, and the like.

Given these complexities, it is very difficult for a person to quickly determine the context of a communication unless that person has an incredible memory, which is rare, or the communication is a part of a communication session in which the person has been currently engaged, thereby putting the communication at the top of the person's mind. Failure to quickly determine the context of a communication may result in an awkward communication, lost content, frustration, or worse.

SUMMARY

There are several variations of the basic problem. As one example, if it has been a period of time since communications from party A to party B have occurred, and if party A is requesting a status update, party B may not remember the context of the discussion or where the discussions left off. While finding a record of the last communication may be possible from searching sent messages and other archives, both the sender and the receiver may not recall the complete context of the discussion if the issue is revisited sometime later. This problem is exacerbated by the addition of multimedia (e.g., voice, video, text, etc.) and/or multi-modal communications.

Similarly, if frequent communications, especially multimedia and/or multi-modal communications, are occurring between two parties, it would be advantageous to summarize recent communications associated with a particular topic regardless of communication modality and provide it with subsequent communications. Here the intent is to differentiate by topic and be able to combine a multi-modal thread that may have voice, email, IM and/or other communications components present.

Another variation of the problem is the instance of communicating with a party where communications are very infrequent. It would be advantageous to be able to efficiently determine when the last time a communication occurred with a party, what the last topic was, and how the communication occurred.

Still another variation of the problem is the case of discussion about current status. It would be advantageous to be able to annotate a summary say with IM and once happy with the resulting updated status, share the revisions with other stakeholders.

In each of these cases it would be advantageous to determine how verbose the summary would be if presented in full. Further, it would be beneficial to be able to, upon user request, expand the summary to include all of the constituent parts in their native format. It would also be advantageous to be able to call any application necessary to display the native format and content of a message without leaving the system and apparatus being used for current communications.

Clearly, a user can search communication histories, archives, storage folders, and set items to find, recover, and reproduce full communication texts or recordings of voice calls. When viewed across multiple threads (i.e., different mediums), multiple communications media/modalities, and between many parties, this is inefficient at best. Further, it requires that the user attach the histories and summarize or at least introduce them in an email. This is also inefficient at best.

It is, therefore, one aspect of the present invention to provide a solution that allows one to search local (to a communication client) and server-based communications logs, sent folders, topical folders, contact databases, social network postings, blogs/microblogs, by sending or receiving party and, in turn, structures the search based on a particular title, topic, subject, or the like.

In some embodiments, contextual information may be retrieved automatically or at the request of a user, for example when a user is accessing a contact manager application (e.g., email application, softphone application, IM application, etc.).

In accordance with at least some embodiments of the present invention, contextual information can be retrieved and incorporated in a communication in response to determining that a user is composing, addressing, or rendering a communication for display. It could also be triggered for new communications, reply communications, forwarding communications, inbound communications, outbound communications, or combinations thereof, possibly depending upon user preferences. The trigger may also be independent of media and/or communication modality.

In accordance with at least some embodiments of the present invention, contextual information can be retrieved by researching inbound and/or outbound communications histories for a particular communication device or for a particular user. The contextual search can also be refined based on one or more of communication medium, communication modality, parties involved in the communication, parties not involved in the communication, topic, keyword, subject, whether a communication is stale (i.e., the communication has not occurred within a relatively recent amount of time), etc.

In accordance with at least some embodiments of the present invention, a user may be allowed to determine the level of detail with which contextual information is rendered in either an inbound or outbound communication. A user may also control the level of detail with which contextual information is depicted for a communication sent to another user. Thus, the receiving user may not fully control the amount of contextual information displayed as a part of a communication. Rather, this can be controlled by the sending user, at least partially. One or both of the sending user or receiving user may also selectively access the underlying complete communications context in their native form. This selective access can be completed by selecting a communication, or engaging an option provided within the communication that provides access to the complete contextual information.

In accordance with at least some embodiments of the present invention, a communication method is provided which generally comprises:

determining that a communication message at least one of (i) has been transmitted, (ii) is being transmitted, and (iii) is being created for transmission from a communication device of a sending party to a communication device of a receiving party;

in response to the determining step, identifying at least one source of contextual information;

generating a contextual filter based on one or more of an identity of the sending party, an identity of the receiving party, a time at which the determining step occurred, a media type of the communication message, and a subject of the message;

retrieving contextual information associated with the communication message by retrieving information from the identified at least one source of contextual information and applying the contextual filter to the information retrieved from the identified at least one source of contextual information;

conditioning the filtered contextual information for presentation in association with the communication message; and causing the filtered contextual information to be presented to at least one of the sending party and receiving along with the communication message.

The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module", "agent", or "tool" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of embodiments of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system using a server(s) and/or database(s), the invention is not limited to use with any particular type of communication system or configuration of system elements. Those skilled in the art will recognize that the disclosed techniques may be used in any communication application in which it is desirable to provide contextual information during or with communications.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1:
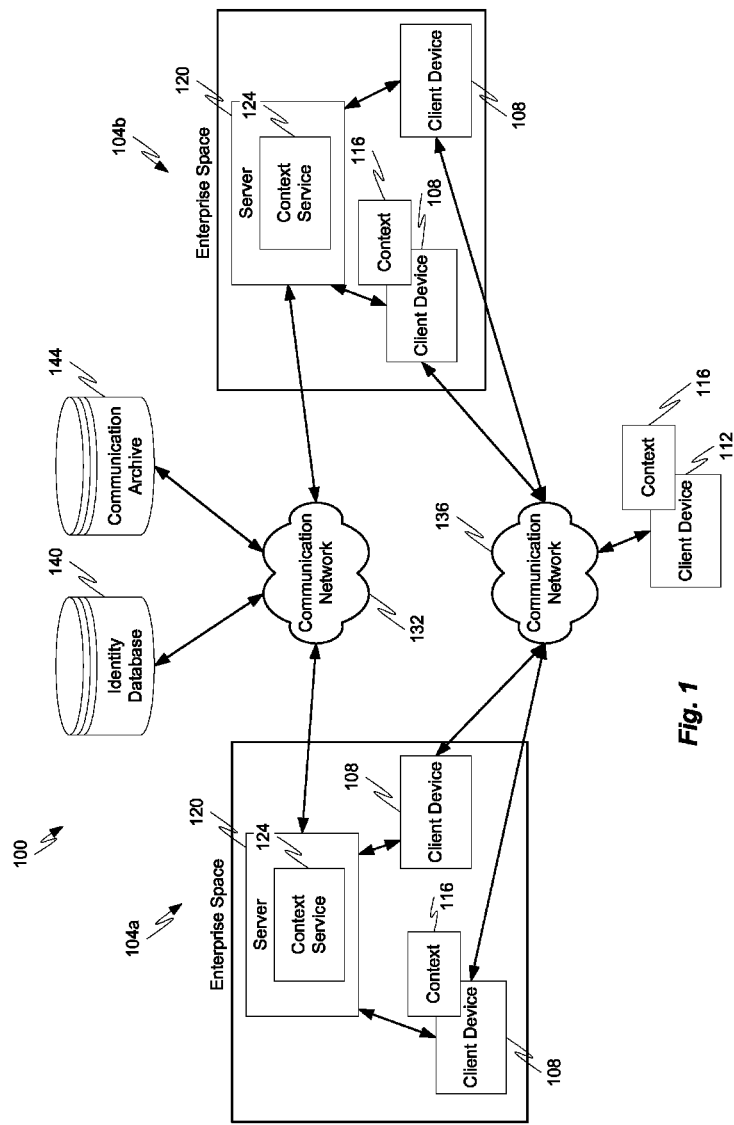
FIG. 1 is a block diagram depicting a communication system in accordance with at least some embodiments of the present invention.

With reference initially to FIG. 1, an exemplary communication system 100 will be described in accordance with at least some embodiments of the present invention. More specifically, the communication system 100 may comprise a plurality of communication devices in communication with one another using a number of possibly different communication modalities. In some embodiments, the communication system 100 includes two or more domains or enterprises 104a, 104b, which are owned and operated by two different entities (e.g., two different companies, enterprises, etc.).

One or both enterprises 104a, 104b may comprise one or more communication devices 108 which allow users in the enterprise to communicate with other users either within the enterprise or with users outside of the enterprise. In particular, the communication devices 108 may be connected to a communication network 136 which facilitates communications with other non-enterprise communication devices 112. Moreover, the communication network 136 may interconnect communication devices 108 in different enterprise domains. The boundaries of the enterprise space 104a, 104b may be defined by network boundary devices, such as Session Border Controllers (SBCs), gateways, or the like.

In some embodiments, the enterprise space 104a, 104b may include dedicated communications equipment or devices, thereby creating a local communication network for the enterprise space 104a, 104b. In particular, the enterprise space 104a, 104b may include a Local Area Network (LAN), a Wide Area Network (WAN), a Session Initiation Protocol (SIP) network, or the like.

The communication network 136 may comprise any type and any number of communication mediums and devices which are capable of supporting communication sessions, such as voice calls, video calls, chats, emails, chats, TTY calls, multimedia sessions, or the like. The communication network 136 may include a LAN, a WAN, a SIP network, and any other type of packet-switched or circuit-switched network known in the art. In addition, it can be appreciated that communication network 136 need not be limited to any one network type, and instead may be comprised of a number of different networks and/or network types. The communication network 136 may include an IP Multi-media Subsystem (IMS) network, an architectural SIP standard well known in the art, or any other type of network which provides access to one or more of the Internet, a standard Plain Old Telephone System (POTS), an Integrated Services Digital Network (ISDN), the Public Switched Telephone Network (PSTN), and any type of known cellular communication network. Accordingly, the communication network 136 is equipped to facilitate communications between client devices 108 and/or 112 via one or more communication media and/or modalities.

In accordance with at least some embodiments of the present invention, and in an effort to make communications between the client devices 108, 112 more efficient and user-friendly, a context service 124 may be provided and made available to one or more of the client devices 108, 112. In some embodiments, the context service 124 may be provided on a server 120 maintained within the enterprise space 104a and/or 104b. In some embodiments, the context service 124 may be provided on a server external to any particular enterprise 104a, 104b utilizing its services. In such an embodiment, the context service 124 may be provided as Software as a Service (SaaS), as an application which leverages cloud computing, or any other software application made available to users on either a subscription basis or paid for according to use. Thus, the context service 124 may be administered by a single enterprise for use by the enterprise client devices 108 or may be administered by a service provider for use by multiple client devices 112.

In some embodiments, the context service 124 may be provided within a communications server, such as a Microsoft® Exchange Server, as a thick client or routine for use by the server. In some embodiments, the context service 124 may be made available for use via a web interface or the like. The format in which the context service 124 is provided may vary depending upon system constraints and customer needs without departing from the scope of the present invention.

In accordance with at least some embodiments of the present invention, the context service 124 may be adapted to search sources of contextual information, such as an identity database 140 and/or communication archive 144, to determine a context or multiple contexts associated with a communication and include such determined contextual information as context 116 in the communication itself (e.g., within a header of the communication, as an attachment to the communication, etc.) or as a supplemental communication to the communication (e.g., as a whisper page in a call, as an email sent at the same time as a voice call, as an email explaining a voicemail message included as an attachment to an email, as an IM explaining an SMS message, as an email reporting a blog or social network posting, or the like). Thus, the context 116 can be provided to a user of the client device 108, 112 to supplement communications sent to and from the client device 108, 112. In some embodiments, the context 116 can be displayed to a user before a communication is transmitted (e.g., while a user is composing an email but before the email has been sent). This may allow the user to appropriately construct the communication to reflect the desired context. Moreover, the sending user can select which context is provided to the receiving user as a part of composing a communication. This can help the sender and receiver collaborate more efficiently and effectively.

The context service 124 may be capable of searching and retrieving relevant contextual information from the identity database 140 and/or communication archive 144 via a communication network 132. The communication network 132 used by the context service 124 may be separate and distinct from the communication network 136. In some embodiments, however, the context service 124 may utilize the communication network 136 to retrieve contextual information from various contextual sources. The communication network 132 may be similar to communication network 136 in that it is configured to carry data packets in the form of messages between devices connected to the communication network 136.

In accordance with at least some embodiments of the present invention, sources of contextual information include, but are not limited to, an identity database 140 and a communication archive 144. The identity database 140 may comprise information which allows a user's identity to be mapped to other identities or aliases used by that user. As an example, a user may have a first identity for a first communication modality (e.g., username@enterprise.com for email) and a second identity for a second communication modality (e.g., +13034441234 for voice calls). In accordance with at least some embodiments of the present invention, the multiple identities of a single user may be mapped together within the identity database 140.

In some embodiments the identity database 140 may be maintained within the enterprise space 104a, 104b and in other embodiments the identity database 140 may be maintained outside the enterprise space 104a, 104b by some service provider (e.g., email service provider, voice communications service provider, IM service provider, social network service provider, etc.) which provides communication services to a user. Although only a single identity database 140 is depicted, one skilled in the art will appreciate that multiple identity databases 140 may be accessed and searched by the context service 124 when searching for contextual information.

In some embodiments, contextual information may be retrieved on an as-needed basis by the context service 124. Alternatively, or in addition, the context service 124 may submit a persistent request to the identity database 140 that causes the identity database 140 to push information to the context service 124 when any information is changed for a particular user or group of users. Thus, the context service 124 only has to request contextual information for a particular user once and any subsequent updates within the identity database 140 can be automatically communicated to the context service 124, thereby reducing the number of communications required to retrieve contextual information. Moreover, once contextual information updates are received at the context service 124, the context service may update a context cache as will be described in further detail below.

In some embodiments, the communication archive 144 serves as a source of contextual information by providing communication histories and related data. In some embodiments, the communication archive 144 maintains communication histories and possibly the communications themselves in an archived format. The communication archive 144 may be adapted to archive communications in different media and/or modality. Thus, the communication archive 144 may be media and/or modality agnostic. In some embodiments, however, the communication archive 144 may be capable of archiving only certain types of communications (e.g., one of emails, text messages, voicemails, call history transcripts, call logs, blogs, social network message boards, etc.). In this configuration, multiple communication archives 144 may be provided for each of the different communication media and modalities that a certain user is capable of using.

In accordance with at least some embodiments of the present invention, the communication archives 144 may be identified within the identity database 140, thereby allowing the context service 124 to reduce the number communication archives 144 which are searched for contextual information for a particular user or communication.

Similar to the identity database 140, the communication archive 144 may be maintained within the enterprise space 104*a*, 104*b* or external to the enterprise space 104*a*, 104*b*. Additionally, the communication archive 144 may be maintained within the server 120 that includes the context service 124, especially if the context service 124 is provided in a communications server such as a Microsoft® Exchange Server. Thus, the communications archive 144 may be local to the context service 124. Alternatively, or in addition, communication archives 144 may be retrieved from client devices 108, 112 if such devices are capable of maintaining a communications log (e.g., missed call log, outgoing call log, incoming call log, email log, SMS message log, IM log, etc.). This provides the context service 124 multiple locations in which contextual information can be retrieved.

Also similar to the identity database 140, the context service 124 may retrieve desired contextual information from the communication archive 144 on an as-needed basis. Alternatively, or in addition, the context service 124 may submit a persistent request to the communication archive 144 that causes the identity communication archive 144 to push information to the context service 124 when any information is changed for a particular user or group of users.

Figure 2:
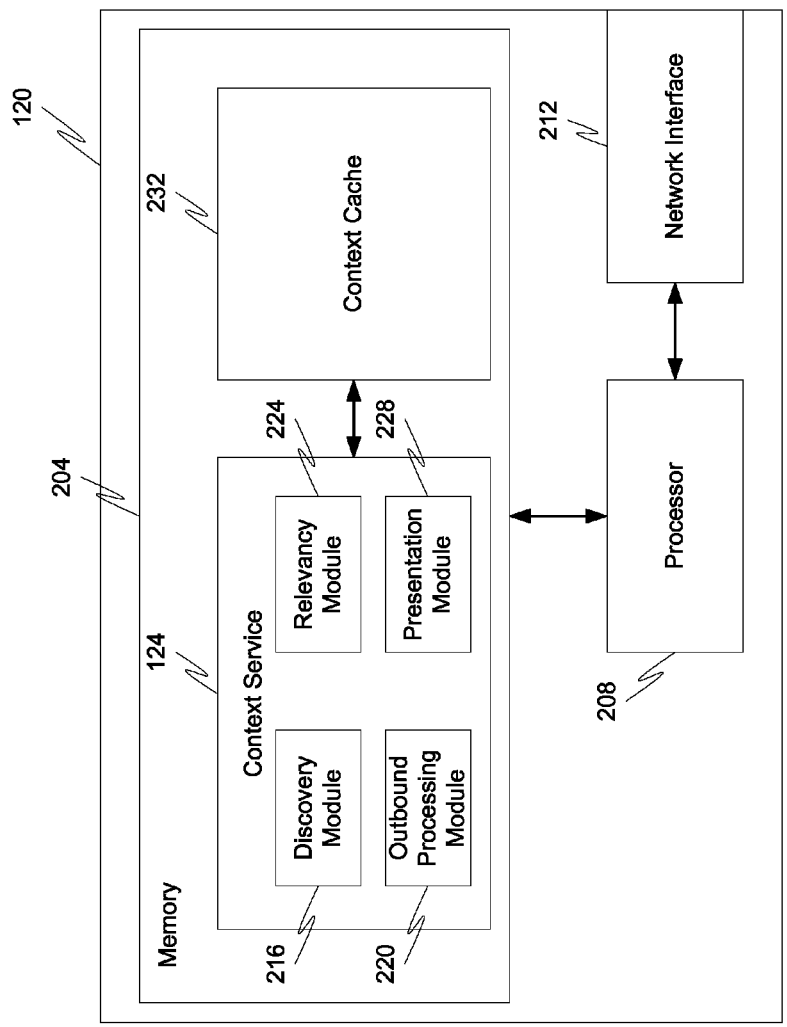
FIG. 2 is a block diagram depicting a server including a context service in accordance with at least some embodiments of the present invention.

With reference now to FIG. 2, additional details of a context service 124 will be described in accordance with at least some embodiments of the present invention. The context service 124 may be provided as instructions in memory 204 which are executable by a processor 208 co-located with the memory 204. Results of the execution of the context service 124 may be shared with client devices 108 and/or 112 via the network interface 212.

The processor 208 may include any general-purpose programmable processor, digital signal processor (DSP) or controller for executing application programming. Alternatively, the processor 208 may comprise a specially configured Application Specific Integrated Circuit (ASIC).

The network interface 212 may comprise a communication modem, a communication port, or any other type of device adapted to condition packets for transmission across the communication network 132, 136 to a destination communication device as well as condition received packets for processing by the processor 208. Examples of network interfaces 212 include, without limitation, a network interface card, a modem, a wired telephony port, a serial or parallel data port, radio frequency broadcast transceiver, a USB port, or other wired or wireless communication network interfaces.

The memory 204 may be provided for use in connection with the execution of programming by the processor 208, and for the temporary or long term storage of program instructions and/or data, such as the context service 124 and a context cache 232. Alternatively or in addition, data storage may be provided separate from the memory 204. The memory 208 may comprise a solid state memory device. Alternatively or in addition, the memory 208 may comprise a hard disk drive or other random access memory. In accordance with still other embodiments, the memory 208 may provide random access storage and/or read-only storage.

In accordance with at least some embodiments of the present invention, the context service 124 may include one or more modules which are responsible for providing certain features of the context service 124. Examples of such modules include, but are not limited to, a discovery module 216, an outbound processing module 220, a relevancy module 224, and a presentation module 228.

The discovery module 216 may be provided to take sender/receiver identity and topic as inputs (among other inputs), generate a filter based on such inputs, and utilize said filter to screen search stored or discovered modes of communications or communication records from the identity database 140 and/or communication archive 144, including but not limited to, email, voice recordings, IM, blogs, microblogs, social media (such as LinkedIn, Facebook, MySpace and the like) and would return relevant search results (i.e., results which met the filter criteria).

The relevancy module 224 may be provided to score the results obtained from the discovery module 216 for relevance and would allow selective user input and editing for maximum accuracy. The discovery 216 and relevance 224 modules could be run at a time of low device and/or server usage and the results could be stored for use and real time update. Storing a recent result and processing a minimal update in real time would prevent delays experienced by the user from being a detrimental factor in using the system.

The presentation module 228 is generally capable of providing the summary of determined context information in a manner appropriate to the accessing of a contact manager, general query, or while composing, addressing, or displaying a message. The presentation module 228 would also control how verbose the summary would be (e.g., less than 100 characters for a desktop application and less than 50 characters for a mobile application) and provide for expansion to the underlying messages in their native format. For example, a brief summary associated with a communication may be initially provided and a more details summary or complete summary may be provided as a click-through (e.g., in response to a user clicking a message or context summary), fly-over (e.g., in response to a cursor passing over a message or context summary), or tab (e.g., as an embedded summary contained within a tab of a communication).

In some embodiments, the outbound processing module 220 is provided to convert the contextual summary to a medium (voice, text, video, combination) appropriate to the mode of communications selected by the user. In some embodiments, a multi-media device (e.g., personal computer, laptop, mobile phone, PDA, etc.) may be equipped render presentation in several media types simultaneously. As one example, if a voice call were incoming, a textual message providing context information could be displayed along with caller identification information. As another example, if an email were received an audible message may be played for a user that describes the associated content of the email. This latter example would be particularly useful in mobile applications where users are driving their car and receive an email. By hearing a brief audible message indicating the context of the received message, the user could quickly determine if it is necessary to pull off the road, park, and reply to the received message. Other exemplary methods of presenting context information are also possible and will become readily apparent to those skilled in the communication arts based on the present disclosure.

The contents of the context service 124 allow the context service 124 to search local and server based communications logs, sent folders, topical folders, contact databases, social network postings, blogs/microblogs, and the like by sending or receiving party and in turn structures the search based on a particular title, topic, subject or the like. It also enables the coherent and succinct rendering of the results of such searches for ease of use by human users of the client devices 112.

Figure 3:
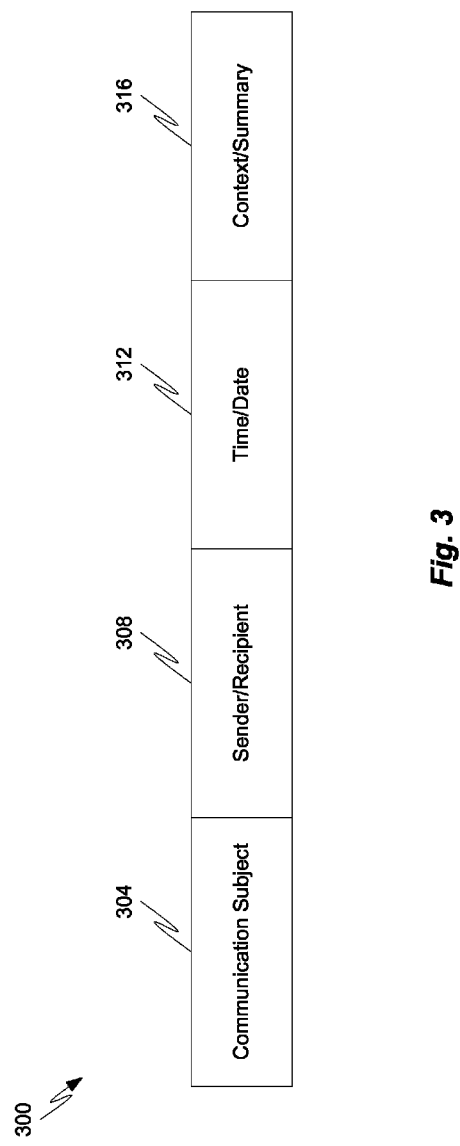
FIG. 3 is a block diagram depicting an exemplary data structure used in accordance with at least some embodiments of the present invention.

With reference now to FIG. 3, an exemplary data structure 300 will be described in accordance with at least some embodiments of the present invention. The data structure 300 may be provided as a header or trailer to a communication message. In some embodiments, the data structure 300 may be incorporated into the body of a communication message. In some embodiments the data structure 300 is incorporated into a text header, email header, SIP header, call header, or the like to provide information about the related communication.

In accordance with at least some embodiments of the present invention, the data structure 300 includes a number of fields describing information about the communication message. Such fields may include, but are not limited to, a communication subject field 304, a sender/recipient field 308, a time/date field 312, and a context/summary field 316.

The subject field 304 may comprise subject information that was entered by a sender of the communication describing, in terms of the sending party, the subject of the communication. In some embodiments, some of all of the content in the subject field 304 may be automatically populated. For instance, if a user is responding to an email communication that was originally sent with a particular subject in the subject field, the content of the subject field may be automatically updated to reflect that the newly sent message is a response or forward message (e.g., FW: Subject or RE: Subject). The population of information in the communication subject field 304 is generally well known to those of skill in the communication arts.

The sender/recipient field 308 may contain information related to the sending and/or receiving party. The amount and specificity of the information in this field may depend upon the nature of the communication (i.e., whether the communication is a voice, text, video, email, or broadcast communication). Some or all of the information contained in the sender/recipient field 308 may be automatically populated by the sending party's device or an intermediate communication device (e.g., switch, server, or proxy server providing communication services to the sending party's device). In some embodiments the sender/recipient field 308 contains a number, IP address, Media Access Control (MAC) address, Address of Record (AOR), or the like associated with one or more of the sending and receiving party. In circumstances where the communication is a collaborative communication (e.g., teleconference, web conference, etc.) the sender/recipient field 308 may contain identification information for one, more, or all of the participants to the collaborative communication. Also, if the data structure 300 is associated with a conference call invite message that is being spawned by a current participant to a conference call, the sender/recipient field 308 may comprise information identifying either just the sender of the invite or identifying all participants to the current conference call.

The time/date field 312 may comprise information related to the time/date at which the communication was generated, sent, received, viewed, replied to, forwarded, stored, archived, deleted, or the like. The time and date information may be specific to the sending device, may include a common reference time (e.g., GMT), or the like.

The context/summary field 316 may be utilized to carry context information for a particular communication message. In some embodiments, the context/summary field 316 is populated concurrent with a user composing a communication message. In such a configuration, the context for the context/summary field 316 is populated based on locally available context information (e.g., context information obtained from a local call log, local message store, a local enterprise server's version of the same, etc.)

Alternatively, or in addition, the context/summary field 316 is populated when the message is sent from the sending party's client device 112. In other words, the context/summary field 316 may be edited by the sending party and finalized upon the sending party hitting the send button or completing dialing of a call.

Alternatively, or in addition, the context/summary field 316 is populated after the message is sent but before it is received by the receiving party's client device 112. In this configuration, the communication message may be forced to traverse a server 120 that includes the context service 124 (e.g., as a sequenced application in a call setup process). Upon receiving the communication message, the context service 124 may determine relevant context information for the communication message and incorporate such information in the message. In other embodiments where the context/summary field 316 was populated before the server 120 received said message, the context service 124 may alter information within the context/summary field 316 (e.g., add information, delete information, edit information, etc.) prior to sending the communication message to the receiving party's client device 112.

Alternatively, or in addition, the context/summary field 316 is populated after the message is received at the receiving party's client device 112 by the receiving party's client device 112. In such a configuration, the population of the context/summary field 316 may be based upon contextual information maintained at the receiving party's client device 112 (e.g., local call log, locally saved messages, and the like) which may or may not match contextual received from global sources. For example, locally maintained call logs may not match a global call log, especially in the context of conference calls and web conferences. Thus, as can be appreciated by those skilled in the art, the context/summary field 316 may be populated and re-populated at multiple points between the sending and receiving user's client devices 112 thereby helping to retrieve the most relevant contextual information for the communication message.

In accordance with at least some embodiments of the present invention, the context/summary field 316 contains one or both of a complete context description and a summary of said context description. In some embodiments, the contextual summary is the content initially rendered for a receiving or sending user and the complete context description is the content from which the summary is determined. In some embodiments, the summary provided to one party (e.g., the sending party) may not necessarily match the summary provided to another party (e.g. the receiving party) even though both parties are interacting with the same communication message. For instance, a first context summary may be presented to a sending party while that party is generating a text/email message or spawning a voice call (e.g., after the call has been dialed but before the call has been answered). This summary may be specifically conditioned to help the sending party intelligently generate the new message. On the other hand, a second context summary for the same communication message may be presented to a receiving party while the party is reviewing a text/email message or while an incoming call is ringing. This second context summary may be specifically conditioned to help the receiving party intelligently answer the new message. The provision of multiple different context summaries enables both parties to more quickly address relevant issues during the current communication session rather than re-address previous issues.

In accordance with at least some embodiments of the present invention, the data from the subject field 304, sender/recipient field 308, and/or time/date field 312 can be used as an input in determining contextual information that ultimately is maintained in the context/summary field 316. In other words, the context service 124 may be adapted to utilize the subject, sender/recipient, and time/date information as inputs in retrieving, scoring, and formatting context information for presentation to a user. It may also be possible to utilize communication type (e.g., voice, text, email, blog, video, etc.) as an additional filter criteria for the context service 124.

Figure 4:
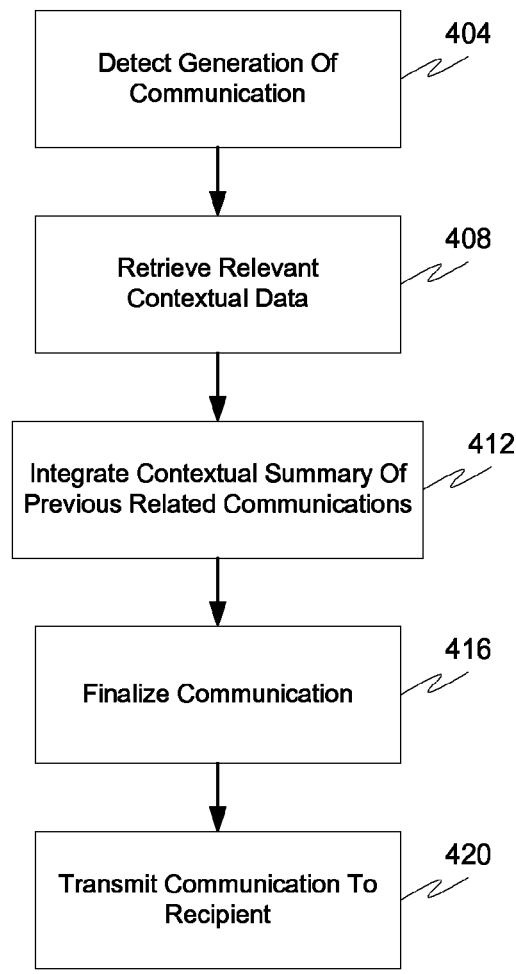
FIG. 4 is a flow diagram depicting an exemplary communication initiation method in accordance with at least some embodiments of the present invention.

Referring now to FIG. 4 an exemplary communication initiation method will be described in accordance with at least some embodiments of the present invention. The method is initiated when the generation of a communication is detected (step 404). The way in which this detection step is executed may depend upon the type of communication being generated. For example, if the communication corresponds to a blog, text, or email communication, then the generation of such a communication may be detected by determining that a user has opened a message composition interface either locally or in a web-based format. If the communication corresponds to a voice or video call, then the generation of such a communication may be detected by determining that a phone is off-hook or by detecting the dialing of numbers. Other mechanisms for detecting the generation of a communication are also well known to those of skill in the art. Moreover, the detection may be performed locally (e.g., at the client device 112) and reported to the context server 120.

Upon detecting the generation of a communication, the context service 124 is invoked to retrieve relevant contextual data from its various context sources (step 408). During this step, the context service 124 may employ one or more of its modules to determine possible locations for contextual information (e.g., identify locations of relevant identity databases 140 and communication archives 144), generate context filters based upon the specifics of the communication (e.g., using subject, sender, receiver, time, and/or media-type information), apply such filters to retrieve relevant information from the context sources, organize and rank the information which has passed the filter criteria, condition the organized and ranked information for presentation to a user associated with the communication, and display such information in a format that can be easily used by the sender or recipient of the communication.

Thus, after the relevant contextual data has been retrieved, filtered, and ranked, as needed or desired, the method continues with the context service 124 integrating the contextual information into the communication (step 412). The communication is then finalized (step 416) and transmitted to the identified recipient (step 420).

In some embodiments, the client device 112 associated with the sending party performs one, more, or all of the steps identified in FIG. 4. In some embodiments, the server 120 performs one, more, or all of the steps identified in FIG. 4. As can be appreciated by one skilled in the art, the steps identified in FIG. 4 may be performed more than once depending upon where the contextual information is stored. As noted above, integrating contextual information into a message may include the context service 124 populating the context/summary field 316 and this step may be performed more than once, especially after the message has been transmitted by the client device 112, depending upon where the contextual information is obtained from. In other words, the contextual summary may be initially integrated with the communication and then modified, as necessary, while the communication is traveling from the sending party to the receiving party. Therefore, the order of the steps depicted in FIG. 4 is subject to re-ordering without departing from the scope of the present invention.

Figure 5:
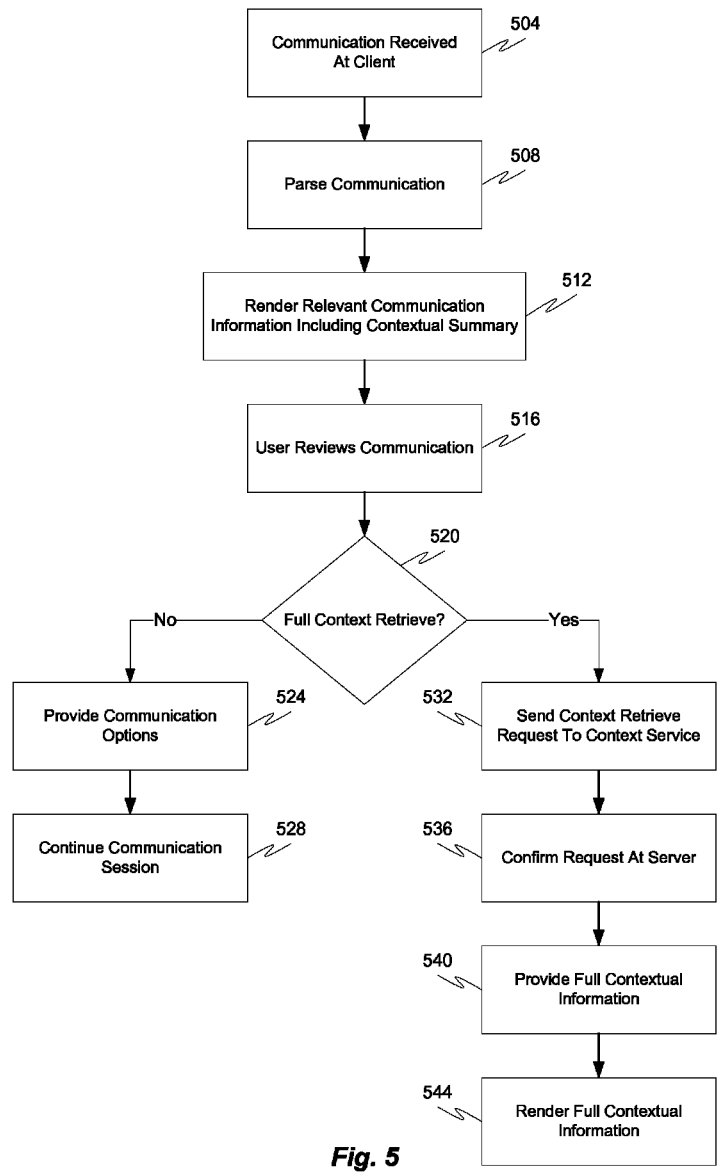
FIG. 5 is a flow diagram depicting an exemplary communication method in accordance with at least some embodiments of the present invention.

With reference now to FIG. 5, an exemplary communication method will be described in accordance with at least some embodiments of the present invention. The method is initiated when a communication message or communication-initiating message is received at a client device 112 (step 504). The manner in which the message is received will depend upon the nature of the communication (i.e., media used for the communication).

The received communication is parsed by the client device 112 and the relevant contextual information is retrieved (step 508). In this step, the client device 112, and more particularly an application being run on the client device 112, is adapted to view the data structure 300 and retrieve the context summary from the context/summary field 316. Based on the information contained in the field, the client device 112 renders a display or presentation that is provided to the user of the client device 112 via a user interface (step 512). The presentation of the contextual summary may be in visible and/or audible form, or any other format that is user-perceivable.

The user of the client device 112 is then able to review the communication along with the presented contextual summary (step 520). Thereafter, it is determined whether a full contextual retrieve is desired (step 520). This query may be answered affirmatively if the reviewing user performs one or more of the following actions: clicks on the contextual summary or a predefined location within the contextual summary; clicks on a summary of the message to review the entire message; opens a dialog box to review the entire message; clicks on a context tab within the communication interface; answers an incoming call; allows the incoming call to pass to voicemail; transfers the message to another party; or has preset preferences to retrieve full contextual information for messages that meet a certain criteria (e.g., rules stating that all messages should display full contextual information when reviewed, rules stating that messages from predetermined parties should display full contextual information when reviewed, etc.).

If the query of step 520 is answered negatively, then the method proceeds by providing the recipient with traditional communication options (e.g., view, reply, forward, drop, delete, save, flag, etc.) (step 524). Thereafter, the communication session is allowed to proceed according to normal procedures (step 528).

Returning back to step 520, if the query is answered affirmatively, then the method proceeds with the client device 112 transmitting a context retrieve request to the context service 124 (step 532). The context service 124 confirms receipt of the request (step 536) and begins processing the request by either retrieving additional context information from various context sources (e.g., the databases 140, 144) or by retrieving the full context information from a cached version of the context information. In some embodiments, the full contextual information may actually be predetermined by the context service 124 but not initially presented to the user. In other words, the full contextual information is used to generate the contextual summary transmitted with the original message. The context information may be cached for a predetermined amount of time and referenced within the context/summary field 316 such that upon sending a request for full context retrieve from the client device 112 to the server 120, the client device 112 only needs to furnish the server 120 with the resource locator (e.g., URL) or similar identification information that can be used by the server 120 to locate the previously determined full context information.

Thereafter, the context service 124 retrieves the necessary contextual information and sends it back to the client device 112 such that it can be presented to the user of the client device 112 (steps 540 and 544).

Figure 6:
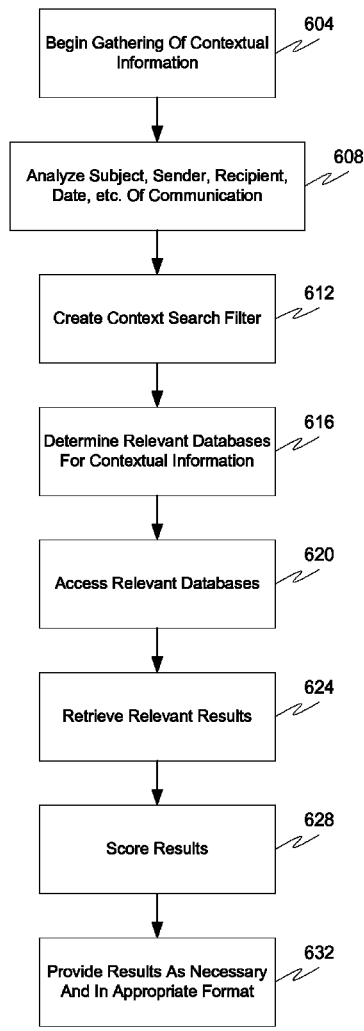
FIG. 6 is a flow diagram depicting an exemplary method of determining contextual information in accordance with at least some embodiments of the present invention.

Referring now to FIG. 6, an exemplary method of determining contextual information will be discussed in accordance with at least some embodiments of the present invention. The method is initiated when the context service 124 employs the discovery module 216 to gather relevant context information from various context sources such as an identity database 140, a communication archive 144, or client-based context sources (step 604). Alternatively, or in addition, the context service 124 may maintain certain user-based or customer-based contextual information for a predetermined amount of time in a locally available context database. Such information may also be referenced during the gathering of contextual information.

Once information has been obtained from the contextual sources, the method continues with the context service 124 analyzing the subject, sender, recipient, date, media-type, etc. of the communication for which contextual information will be provided (step 608). Based on one or more of these inputs and/or user-received inputs, the discovery module 216 generates a context search filter that will be applied against retrieved context information (step 612).

Thereafter, the context service 124 invokes the discovery module 216 to positively identify which context sources will be searched for the generation of context information (step 616). As can be appreciated by one skilled in the art, the discovery module 216 may be configured to search multiple context sources.

The identified context sources are then accessed by the discovery module 216 (step 620) and relevant context results are obtained (step 624). In accordance with at least some embodiments of the present invention, the discovery module 216 may retrieve relevant context results from a plurality of context sources. In particular, the discovery module 216 may retrieve contextual information for a first type of communication (e.g., text-based communication) from a number of different context sources grounded in different media types (e.g., text-based sources of contextual information, voice-based sources of contextual information, video-based sources of contextual information, etc.) Thus, the definition of relevant context results will vary depending the filter criteria used by the discovery module 216.

The relevant context results may then be scored and possibly ranked according to their score by the relevancy module 224 (step 628). Scores for results can be determined based on the number of matches that the result has as compared to the filter requirements. For example, an archived message that has a term occurring ten times in its body that matches the filter's subject term may receive a higher ranking than an archived message that has only one occurrence of the same subject term. Additionally, an archived message in which either the sending or receiving party of a current message (i.e., a message which is having contextual information determined for it) was involved may receive a higher score than archived message that did not involve the sending or receiving party of a current message. Other modes of determining scores and ranks for search results will become readily apparent to those of skill in the art based on this disclosure.

The full set of ranked context results can then be provided to a user as necessary and in any format desired by the user (step 632). The manner in which the context results are provided to a user (i.e., sender and/or receiver) can be controlled by the outbound processing module 220 and/or presentation module 228 consistent with rules programmed into such modules. For example, a user can be provided a summary of the contextual information, the complete results of the contextual search and ranking, or any other indicia of contextual information. As one non-limiting example, the presentation of contextual information may simply comprise presenting a flag associated with a message indicating that a message has contextual information associated therewith, highlighting a message to indicate that the message has contextual information associated therewith, providing a predefined audible alert indicating that the message has contextual information associated therewith, including a tab within a message as a means of accessing contextual information associated with a message, and the like.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication and computer arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with embodiments of the present invention, systems, apparatuses and methods for determining and disseminating contextual information in connection with enhancing communications. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method, comprising:
    determining that a communication message is at least one of (i) transmitted, (ii) being transmitted, or (iii) being created for transmission from a communication device of a sending party to a communication device of a receiving party via an electronic communications network;
    in response to the determining, identifying sources of contextual information comprising at least two of the following: a message archive for voice messages, a message archive for emails, a message archive for Short Messenger Service (SMS) text messages, a call log of the sending party, a call log of the receiving party, a global call log maintained in a shared communication archive, or a context cache;
    generating a contextual filter based on one or more of an identity of the sending party, an identity of the receiving party, a time at which the determining occurred, a media type of the communication message, or a subject of the message;
    retrieving filtered contextual information associated with the communication message by retrieving information from the sources of contextual information and applying the contextual filter to the information retrieved from the sources of contextual information;
    conditioning the filtered contextual information for presentation in association with the communication message;
    causing the filtered contextual information to be presented to at least one of the sending party or the receiving party along with the communication message;
    assigning a contextual relevancy score to each instance of information retrieved from the sources of contextual information based on a matching of the instance of information to the parameters of the contextual filter;
    ranking each instance of information according to its assigned contextual relevancy score; and
    presenting only a subset of each instance of information to at least one of the sending party or receiving party.

2. The method of claim 1, wherein the communication message is transmitted in a first modality and wherein the filtered contextual information is presented to at least one of the sending or receiving party in a second, different modality.

3. The method of claim 1, wherein a contextual summary having less than a predetermined number of characters is initially presented to at least one of the sending party or receiving party, wherein the contextual summary is determined based on the filtered contextual information but comprises fewer characters than the filtered contextual information, and wherein the filtered contextual information is accessible via the contextual summary.

4. The method of claim 3, wherein the filtered contextual information is accessed by at least one of the sending party or receiving party when at least one of the following is detected: the contextual summary or a predefined location within the contextual summary has been selected; a dialog box to review the entire communication message has been opened; a context tab has been selected; an incoming call is answered; an incoming call is allowed to pass to voicemail; the communication message has been transferred.

5. The method of claim 1, wherein the identifying, generating, retrieving, and conditioning steps are performed at least twice.

6. The method of claim 5, wherein a first instance of the identifying, generating, retrieving, and conditioning steps are performed where the communication message is being created and wherein a second instance of the identifying, generating, retrieving, and conditioning steps are performed after the communication device of the sending party has transmitted the communication message.

7. The method of claim 6, wherein the first instance of identifying, generating, retrieving, and conditioning steps result in the generation of a first instance of contextual information that is displayed to the sending user, wherein the second instance of identifying, generating, retrieving, and conditioning steps result in the generation of a second instance of contextual information that is displayed to the receiving user, and wherein the first and second instance of contextual information are different.

8. A communication system comprising a server, comprising:
    a context service operating, at least in part, on the server, the context service including:
        a discovery module that identifies sources of contextual information for a communication message in response to determining that the communication message is at least one of (i) transmitted, (ii) being transmitted, or (iii) being created for transmission from a communication device of a sending party to a communication device of a receiving party via an electronic communications network, the discovery module generating a contextual filter based on one or more of an identity of the sending party, an identity of the receiving party, a time at which the determining step occurred, a media type of the communication message, or a subject of the message, and then retrieving filtered contextual information associated with the communication message by retrieving information from the sources of contextual information and applying the contextual filter to the information retrieved from the sources of contextual information, wherein the sources of contextual information comprises at least two of the following: a message archive for voice messages, a message archive for emails, a message archive for text messages, a call log of the sending party, a call log of the receiving party, a global call log maintained in a shared communication archive, and a context cache;

a presentation module that conditions the filtered contextual information for presentation in association with the communication message; and a network interface that transmits the filtered contextual information to at least one of a sending party or a receiving party for presentation on a communication device of the at least one of a sending party or receiving party; and wherein the context service further comprises a relevancy module that assigns a contextual relevancy score to each instance of information retrieved from the sources of contextual information based on a matching of the instance of information to the parameters of the contextual filter, ranks each instance of information according to its assigned contextual relevancy score, and presents only a subset of each instance of information to at least one of the sending party or receiving party.

9. The system of claim 8, wherein the communication message is transmitted in a first modality and wherein the filtered contextual information is presented to at least one of the sending or receiving party in a second, different modality.

10. The system of claim 8, wherein a contextual summary having less than a predetermined number of characters is initially presented to at least one of the sending party or receiving party, wherein the contextual summary is determined based on the filtered contextual information but comprises fewer characters than the filtered contextual information, and wherein the filtered contextual information is accessible via the contextual summary.

11. The system of claim 10, wherein the filtered contextual information is accessed by at least one of the sending party or receiving party when at least one of the following is detected: the contextual summary or a predefined location within the contextual summary has been selected; a dialog box to review the entire communication message has been opened; a context tab has been selected; an incoming call is answered; an incoming call is allowed to pass to voicemail; or the communication message has been transferred.

12. The system of claim 8, wherein the sources of contextual information includes a database storing voice call conversations which have been archived via speech-to-text and analyzed for contextual information.

13. The system of claim 8, wherein the discovery module is invoked multiple times as the communication message travels from the sending party to the receiving party, wherein the discovery module is invoked in a first instance while the communication message is being created and wherein the discovery module is invoked in a second instance after the communication device of the sending party has transmitted the communication message.

14. The system of claim 13, wherein the first instance of invocation results in the generation of a first instance of contextual information that is displayed to the sending user, wherein the second instance of invocation results in the generation of a second instance of contextual information that is displayed to the receiving user, and wherein the first and second instance of contextual information are different.

15. The system of claim 13, wherein during the first instance of invocation a call log for the sending party is utilized as a source of contextual information and wherein during the second instance of invocation a call log for the receiving party is utilized as a source of contextual information.

16. The system of claim 13, further comprising a client device including the context service, wherein the context service operating on the client device is invoked during the first instance and wherein the context service operating on the server is invoked during the second instance.

17. A non-transitory medium with instructions thereon that when read by a computer cause the computer to perform:

determining that a communication message is at least one of (i) transmitted, (ii) being transmitted, or (iii) being created for transmission from a communication device of a sending party to a communication device of a receiving party via an electronic communications network;

in response to the determining, identifying sources of contextual information comprising at least two of the following: a message archive for voice messages, a message archive for emails, a message archive for Short Message System (SMS) text messages, a call log of the sending party, a call log of the receiving party, a global call log maintained in a shared communication archive, or a context cache;

generating a contextual filter based on one or more of an identity of the sending party, an identity of the receiving party, a time at which the determining step occurred, a media type of the communication message, and a subject of the message;

retrieving filtered contextual information associated with the communication message by retrieving information from the sources of contextual information and applying the contextual filter to the information retrieved from the sources of contextual information;

conditioning the filtered contextual information for presentation in association with the communication message;

causing the filtered contextual information to be presented to at least one of the sending party or the receiving party along with the communication message;

assigning a contextual relevancy score to each instance of information retrieved from the sources of contextual information based on a matching of the instance of information to the parameters of the contextual filter;

ranking each instance of information according to its assigned contextual relevancy score; and presenting only a subset of each instance of information to at least one of the sending party or receiving party.

18. The non-transitory medium of claim 17, wherein the communication message is transmitted in a first modality and wherein the filtered contextual information is presented to at least one of the sending or receiving party in a second, different modality.

19. The non-transitory medium of claim 17, wherein a contextual summary having less than a predetermined number of characters is initially presented to at least one of the sending party or receiving party, wherein the contextual summary is determined based on the filtered contextual information but comprises fewer characters than the filtered contextual information, and wherein the filtered contextual information is accessible via the contextual summary.

20. The non-transitory medium of claim 19, wherein the filtered contextual information is accessed by at least one of the sending party or receiving party when at least one of the following is detected: the contextual summary or a predefined location within the contextual summary has been selected; a dialog box to review the entire communication message has been opened; a context tab has been selected; an incoming call is answered; an incoming call is allowed to pass to voicemail; or the communication message has been transferred.

* * * * *